United States Patent
Chang et al.

(10) Patent No.: US 6,808,628 B2
(45) Date of Patent: Oct. 26, 2004

(54) MEMBRANE BIOREACTOR USING NON-WOVEN FABRIC FILTRATION

(75) Inventors: Wang-Kuan Chang, Hsinchu (TW); Min-Chao Chang, Hsinchu (TW); Ren-Yang Horng, Hsinchu (TW); Hsin Shao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/119,096

(22) Filed: Apr. 10, 2002

(65) Prior Publication Data
US 2003/0192825 A1 Oct. 16, 2003

(51) Int. Cl.[7] .............................. B01D 29/11; C02F 3/00
(52) U.S. Cl. .................... 210/323.2; 210/609; 210/346; 210/483; 210/486; 210/487; 210/497.01
(58) Field of Search .................... 210/321.6, 321.44, 210/321.78, 321.87, 609, 620, 650, 615, 108, 416.1, 457, 459, 483, 497.01, 506, 507, 323.2, 346, 486, 484, 487, 416, 628

(56) References Cited

U.S. PATENT DOCUMENTS

| | | | |
|---|---|---|---|
| 5,772,831 A | 6/1998 | Moro et al. | 156/309.3 |
| 5,868,933 A * | 2/1999 | Patrick et al. | 210/484 |
| 5,954,962 A * | 9/1999 | Adiletta | 210/490 |
| 6,355,171 B1 * | 3/2002 | Rose et al. | 210/323.2 |

FOREIGN PATENT DOCUMENTS

JP    11-019671    * 1/1999

* cited by examiner

Primary Examiner—Benjamin L. Utech
Assistant Examiner—Krishnan S Menon
(74) Attorney, Agent, or Firm—Bacon & Thomas, PLLC

(57) ABSTRACT

A submerged membrane bioreactor includes a tank containing a mixed liquor having microorganism; and a filtration module immersed in the mixed liquor and having a permeate side in fluid communication with the mixed liquor only through the filtration module. The filtration module includes a porous support having a first surface forming the permeate side and a second surface opposing to the first surface; and a non-woven fabric membrane covering the second surface and having a thickness of 0.1–2 mm and a pore size of 0.2–100 μm.

5 Claims, 1 Drawing Sheet

MEMBRANE BIOREACTOR USING NON-WOVEN FABRIC FILTRATION

FIELD OF THE INVENTION

The present invention relates to a submerged membrane bioreactor, and particularly to a non-woven fabric membrane filtration module disposed therein.

BACKGROUND OF THE INVENTION

In an activated sludge process for treating wastewater, the use of an ultrafiltration (UF) or microfiltration (MF) unit in a solid/liquid separation membrane bioreactor to replace the sedimentation tank/sand filtration tank started in 1969. In comparison with the conventional activated sludge process, the solid/liquid separation membrane biological treatment technique has many technical advantages, e.g. a long sludge retention time, capable of treating wastewater with a high concentration variation, without the need of using a sedimentation unit (less footprint), etc. Up to now, there are at least 500 solid/liquid separation membrane biological treatment plants being operated world-widely. Most of the membrane materials used by the plants are microporous polymeric materials (with a pore size of 0.1~10 $\mu$m) or inorganic ceramic materials. Typical examples include U.S. Pat. No. 5,204,001, which discloses a membrane bioreactor system for treating wastewater from a metal processing plant; and WO0037369, which discloses a membrane bioreactor for nitrogen-containing water treatment.

U.S. Pat. No. 5,772,821 discloses an immersed plate-and-frame type filtration membrane for wastewater treatment, which comprises a plate-like support made of non-woven fabric and an organic filtration membrane formed on the surface of the plate-like non-woven fabric support. Said organic filtration membrane is an ultrafiltration membrane or a precision filtration film.

There are many types of membrane applied in the solid/liquid separation membrane biological technique; however, the pore sizes of the membranes are in the ranges of the UF and MF membranes, which limits said technique to be widely used, because of, for examples, a higher influent quality required, higher initial capital cost and energy consumption cost compared to the conventional activated sludge technique. Consequently, said technique will be more widely used, if the drawbacks can be avoided.

SUMMARY OF THE INVENTION

A primary objective of the present invention is to provide a membrane bioreactor having a non-woven fabric filtration membrane, which has a lower transmembrane pressure, a less tendency of fouling and a less energy consumption than the current solid/liquid separation membrane bioreactors.

In order to achieve the abovementioned objective, a membrane bioreactor (MBR) constructed according to the present invention comprises:

a tank containing a mixed liquor;

a filtration module immersed in said mixed liquor and having a permeate side in fluid communication with said mixed liquor only through said filtration module;

a negative pressure source for generating a hydraulic pressure on said permeate side smaller than that of the mixed liquor;

characterized in that said filtration module comprises:

a porous support having a first surface and a second surface opposite to said first surface, said porous support having pores larger than 300 $\mu$m; and a non-woven fabric membrane covering said second surface, said non-woven fabric membrane having a thickness between 0.1–2 mm and pores of 0.2–100 $\mu$m;

wherein said non-woven fabric membrane contacts with said mixed liquor, and the first surface of said porous support forms said permeate side.

Preferably, the shortest distance between the first surface and the second surface of said porous support is 3–10 mm.

Preferably, the bioreactor of the present invention further comprises an additional non-woven fabric membrane covering said non-woven fabric membrane. Said additional non-woven fabric membrane has a thickness of 0.1.–2 mm and pores of 0.2–100 $\mu$m.

Preferably, said porous support is made of a non-woven or other porous material.

Preferably, said non-woven fabric membrane is made of a polymer material selected from the group consisting of polypropylene, polyethylene, polyamide, polyester, polyfluorocarbon, polyacrylonitrile, and polyurethane.

Preferably, said non-woven fabric membrane is hydrophilic, and is subjected to an activated grafting surface treatment of a hydrophilic monomer.

Preferably, said filtration module has a total filtration resistance of $10_{11}$–$10^{12}$ m$^{-1}$ towards water.

Figure 1:
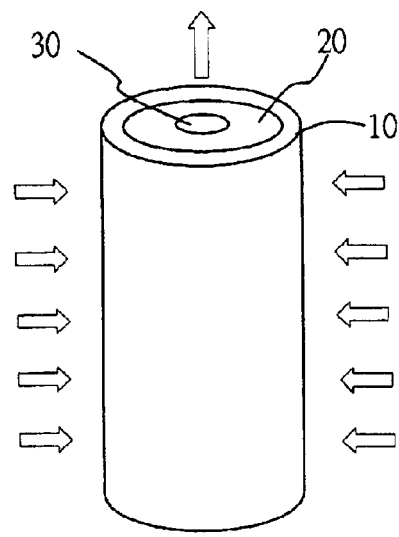
FIG. 1 shows a schematic diagram of a filtration module constructed according to a preferred embodiment of the present invention.

Legends
1 . . . inlet water
2 . . . inlet water tank
3 . . . inlet water pump
4 . . . membrane bioreactor
5 . . . filtration module
6 . . . blower
7 . . . air
8 . . . outlet water pump
9 . . . outlet water
10 . . . non-woven fabric membrane
11 . . . pressure gauge
12 . . . outlet water flowmeter
13 . . . inlet water flowmeter
20 . . . support
30 . . . central passage

DETAILED DESCRIPTION OF THE INVENTION

The present invention discloses a membrane bioreactor using a non-woven fabric filtration membrane, which can be used for the treatment of domestic wastewater, industrial wastewater, farming wastewater, nitrogen removal from water or waste water, and wastewater recovery.

The present invention discloses a membrane bioreactor using a non-woven fabric filtration membrane, which comprises a filtration module immersed in the mixed liquor in the bioreactor. The filtration module comprises a non-woven fabric membrane with a suitable thickness and pore size wrapping on a porous support, e.g. a hollow tubular non-woven filter core. The thickness and the pore size of the non-woven fabric membrane can be determined by the required operating flux and other needs. The binding of the non-woven fabric membrane and the support can be done by using a hot-melt resin adhesion, an adhesive adhesion or other appropriate adhesions. The binding area between the two must be large enough to provide a sufficient strength for performing a back washing operation. Preferably, the binding portions of the non-woven fabric membrane and the support are at their edge regions, which will minimize the influence on the flux of water through said filtration module. In order to obtain an optimal operating flux, the pore size of the non-woven fabric membrane on the outer side of the module should be less than 100 $\mu$m. If the pore size exceeds 100 $\mu$m, the result of filtration is poor and a fouling is liable to occur. The thickness of the non-woven fabric membrane is preferably maintained at less than 2 mm so that the fouling is easy to be removed during a back washing operation.

A polymeric non-woven fabric is commonly used as a fibrous filtration material for particulate contaminants in air. The pore sizes of this type of fibrous filtration material usually are within 1–50 $\mu$m and such a fibrous filtration material can filter out particles larger than 0.1 $\mu$m in air. The non-woven fabric filtration material has a fibrous pore larger than the tiny particles being filtered. Obviously, the filtration mechanism consists not only of the sieving separation mechanism of an ordinary microporous membrane. The specific matrix structure of the non-woven fabric material enables the small particles in the pores to be captured, thereby enhancing the filtration performance. The non-woven fabric filtration material is also often used as a filtration core material for filtering tap water. This type of filtration core material uses the abovementioned principle to capture particles of various sizes in water thereby achieving the purpose of a "cleaner" water. After using for a certain period of time, the pores of the filtration material are gradually blocked such that the flux is greatly reduced. At such a stage, the filtration material is discarded. The size of the pores of the filtration material is about 50–100 $\mu$m.

Among the current solid-liquid separation membrane biological treatment techniques, the membranes used have a pore size in the range of UF and MF without using the abovementioned non-woven fabric filtration material. The reason for this could be that the abovementioned non-woven fabric filtration material is highly hydrophobic and has too large a pore size. As a result, the biological sludge at a high concentration is liable to cause a blockage on the pores of the non-woven fabric filtration material, thereby reducing the permeate flux through the non-woven fabric filtration material and greatly reducing the effectiveness of the non-woven fabric filtration material and shortening its operating life. Such that such a non-woven fabric filtration material is not suitable to be used directly in the solid-liquid separation membrane biological treatment techniques. Therefore, for a non-woven fabric filtration material to be used in a solid/liquid separation bioreactor, the material needs to have a suitable hydrophilic treatment and has a suitable pore size. Such a material, together with a support, can have a greatly improved performance and better properties than the current microporous membrane.

A hydrophilic non-woven fabric membrane suitable for use in the present invention is prepared by either coating a hydrophilic polymer layer on a non-woven fabric membrane or grafting a hydrophilic monomer, such as an acrylic acid or its derivatives, or another polymerizable hydrophilic monomer, onto a non-woven fabric membrane by a grafting polymerization process.

As shown in FIG. 1, a filtration module constructed according to a preferred embodiment of the present invention is formed by wrapping a support 20 having a hollow tubular shape with a hydrophilic non-woven fabric membrane 10 having a suitable thickness and pore size. Said non-woven fabric membrane 10 come into contact with water to be treated. Said support 20 has a central passage 30; and a pump (not shown in the figure) is used to generate a suction in said central passage 30. Thus, said water to be treated penetrates through said non-woven fabric membrane 10 and said support 20, and becomes a permeate in said central passage 30. Said support 20 has a larger pore size to facilitate the penetration of water. Such a support could be a non-woven fabric filtration material or another porous filtration material. Its pore size is larger than 300 $\mu$m. In order to maintain a suitable strength, the thickness of said support 20 is in the range of 3–10 mm. As mentioned before, the filtration mechanism of a non-woven fabric filtration material is different from that of an ordinary MF or UF porous membrane. Other than the sieving mechanism, the filtration mechanisms of the non-woven fabric filtration material further include the inertial impaction mechanism, the direct interception mechanism and the Brownian diffusion mechanism of an ordinary non-woven fabric filtration material, and thus can filter out particles in a wide range of size distribution. Thus, the present invention uses a non-woven fabric membrane having a larger pore size in the filtration module of the membrane bioreactor. As a result, such a filtration module can be operated at a lower operation pressure and obtain a larger flux of permeate, thereby reducing the energy consumption and the formation of fouling. Since the non-woven fabric membrane 10 on the outer layer has a lower cost, it can be replaced for restoring a larger permeate flux when the flux becomes too low.

Figure 2:
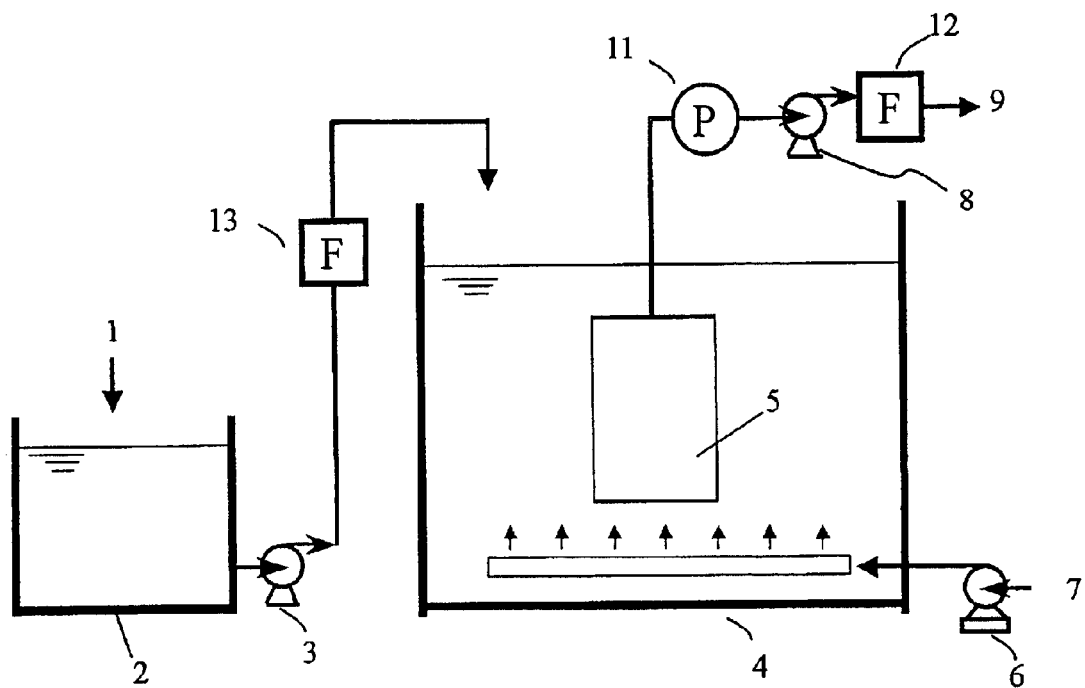
FIG. 2 shows a schematic diagram of an immersed type membrane bioreactor system using a filtration module of the present invention.

An immersed type membrane bioreactor system using the filtration module of the present invention is shown in FIG. 2. An inlet water 1, from an inlet water tank 2, is quantitatively pumped into a membrane bioreactor 4 through a water pump 3. A filtration module 5 of the present invention is mounted in said reactor 4. Air is pumped into the bottom of said membrane bioreactor 4 through an blower 6 to provide oxygen required by the membrane bioreactor system. The permeate, i.e. an outlet water, is discharged by an outlet pump 8. Other important process control devices include: an inlet water flow meter 13, a pressure gauge 11 and an outlet water flow meter 12, etc.

The present invention will be better understood by the following examples which are for illustrative only and not for limiting the scope of the present invention.

EXAMPLE 1

This example used an immersed type membrane bioreactor system similar to FIG. 2. The wastewater treated in this example was prepared by using sodium citrate as a main ingredient, and adding minute amounts of urea, phosphoric acid and ferric chloride, in order to provide the microorganisms with a sufficient amount of nutrient. The composition of the wastewater was shown in Table 1. The non-woven fabric membrane used in the filtration module was a polypropylene (PP) non-woven fabric with a thickness of 0.3 mm, a surface area of 0.1 m$^2$, and an average pore size of 39 $\mu$m. Said PP non-woven fabric acquired hydrophilicity after a surface treatment of an activated grafting of acrylic acid monomer. The support used in the filtration module was a PP non-woven fabric having a hollow tubular shape and having a thickness of 6 mm and a central passage diameter of 20 mm.

Operation conditions of the membrane bioreactor were: sludge concentration (volatile suspended solids, VSS) of 10,000 mg/L, pH 6~8, dissolved oxygen (DO) of more than 2 mg/L, volumetric loading of 1.0 kg COD/$m^3$.d. The COD concentration of the inlet water fluctuated in the range from 300 mg/L to 1,000 mg/L. The COD concentration of the processed water was reduced to 50 mg/L; the SS approached the detection limit. The experimental period was 120 days. The experiment results show that, in comparison with the conventional microporous membrane, the present invention still can reach a pretty good water quality while using a non-woven fabric membrane having larger pore size. The total filtration resistance measured is about $10^{11}$ to $10^{12}$ $m^{-1}$. Therefore, in comparison with a membrane bioreactor using the microporous membrane, same level of permeate flux can be obtained while only using a lower driving force (energy consumption).

TABLE 1

| sodium citrate (COD) | 1,000~5,000 mg/L |
|---|---|
| nutrient | 2~6 ml/50 L waste water |
| Source of nutrient (COD 6,000 mg/L, addition of 2 ml/L) | |
| Urea | 160.5 g/L |
| $KH_2PO_4$ ($K_2HPO_4$) | 70 g/L (84 g) |
| $FeCl_3.6H_2O$ | 36 g/L |

EXAMPLE 2

This experiment used a membrane bioreactor system that was the same as the one used in Example 1. A wastewater generated from a factory which produced hygiene products was treated. The wastewater contained surfactants, preservatives and flavors, etc., and was more difficult to be degraded biologically. The non-woven fabric membrane of the filtration module had a surface area of 0.3 $m^2$ and an average pore size of 39 $\mu$m. Operation conditions of the membrane bioreactor were: sludge concentration (volatile suspended solids, VSS) of 5,000 mg/L, pH 6~8, dissolved oxygen (DO) of more than 2 mg/L, volumetric loading of 0.5–1.0 kg COD/$m^3$.d. The COD concentration of the inlet water fluctuated in the range from 400 mg/L to 1,600 mg/L. The COD concentration of the processed water was reduced to the range from 70 mg/L to 200 mg/L; the SS thereof approached the detection limit. The experiment results show that, in comparison with the conventional microporous membrane, the present invention can reach a pretty good water quality while using a non-woven fabric membrane having larger pore size. During the 20 days of operation, the specific flux of the filtration module was 0.025–0.04 ($m^3$ $m^{-2}$-d-kPa) without the occurrence of a conspicuous fouling problem.

What is claimed is:

1. A membrane bioreactor comprising:

a tank containing a mixed liquor including concentrated microorganisms and sludge;

a filtration module immersed in said mixed liquor and having a permeate side in fluid communication with said mixed liquor only through said filtration module;

a negative pressure source for generating a hydraulic pressure on said permeate side smaller than that of the mixed liquor;

characterized in that said filtration module comprises:

a porous support having a first surface and a second surface opposite to said first surface, said porous support being made of a non-woven fabric and having pores larger than 300 $\mu$m; and a non-woven fabric membrane covering said second surface, said non-woven fabric membrane having a thickness between 0.1–2 mm and pores of 0.2–100 $\mu$m;

wherein said non-woven fabric membrane contacts with said mixed liquor, and the first surface of said porous support forms said permeate side, wherein a shortest distance between said first surface and said second surface of said porous support is between 3–10 mm, and wherein said mixed liquor including concentration microorganisms and sludge comprises at least 5000 mg/L of volatile suspended solids.

2. The bioreactor as claimed in claim 1 further comprising an additional non-woven fabric membrane covering said non-woven fabric membrane and said additional non-woven fabric membrane having a thickness of 0.1–2 mm and a porosity of 0.2 –100 $\mu$m.

3. The bioreactor as claimed in claim 1, wherein said non-woven fabric membrane is a polymer material selected from the group consisting of polypropylene, polyethylene, polyamide, polyester, polyfluorocarbon, polyacrylonitrile, and polyrethane.

4. The bioreactor as claimed in claim 3, wherein said non-woven fabric membrane is hydrophilic.

5. The bioreactor as claimed in claim 4, wherein said non-woven fabric membrane is subjected to an activated grafting surface treatment of a hydrophilic monomer.

* * * * *